United States Patent
Haapoja et al.

(10) Patent No.: US 7,295,812 B2
(45) Date of Patent: Nov. 13, 2007

(54) METHOD AND APPARATUS PROVIDING ADAPTABLE CURRENT CONSUMPTION FOR MOBILE STATION BASED ON MACROCELL/MICROCELL DETERMINATION

(75) Inventors: Sami Haapoja, Helsinki (FI); Marko E. Leinonen, Oulu (FI)

(73) Assignee: Nokia Corporation, Espoo (FI)

( * ) Notice: Subject to any disclaimer, the term of this patent is extended or adjusted under 35 U.S.C. 154(b) by 273 days.

(21) Appl. No.: 10/185,840

(22) Filed: Jun. 26, 2002

(65) Prior Publication Data
US 2004/0002306 A1    Jan. 1, 2004

(51) Int. Cl.
*H04B 1/00* (2006.01)
(52) U.S. Cl. ............... 455/63.1; 455/67.13; 455/67.11; 455/296
(58) Field of Classification Search ............... 455/63.1, 455/63.3, 67.11, 67.13, 295, 296, 343.1, 343.2, 455/574; 341/155, 161
See application file for complete search history.

(56) References Cited

U.S. PATENT DOCUMENTS

| | | | |
|---|---|---|---|
| 4,910,752 A * | 3/1990 | Yester et al. ................. 375/316 |
| 5,793,744 A | 8/1998 | Kanerva et al. ............. 370/209 |
| 6,009,129 A * | 12/1999 | Kenney et al. .............. 375/346 |
| 6,167,240 A | 12/2000 | Carlsson et al. ............ 455/67.3 |
| 6,178,211 B1 * | 1/2001 | Whikehart et al. ......... 375/350 |
| 6,515,609 B1 * | 2/2003 | Moulsley .................... 341/155 |
| 6,577,603 B1 | 6/2003 | Hakalin et al. ............. 370/252 |
| 6,901,243 B2 * | 5/2005 | Jayaraman et al. ........ 455/63.1 |
| 2003/0078007 A1 * | 4/2003 | Parssinen et al. .......... 455/67.1 |

OTHER PUBLICATIONS

Gang Li et al., "A Speed Estimation Based Two-Stage Symbol Aided Channel Estimator For Frequency NonSelective Variant Fading Channel", IEEE, ICPWC'2000, pp. 109-113.

* cited by examiner

*Primary Examiner*—Sanh D. Phu
(74) *Attorney, Agent, or Firm*—Harrington & Smith, PC (57) ABSTRACT

A method is disclosed for operating a mobile station (100) by determining whether there is a decreased probability of a presence of a transmitter (4) near to the mobile station that is transmitting on a frequency channel that is adjacent to a frequency channel being received from a serving cell transmitter (2) and, for a case where it is determined that there is a decreased probability of the presence of the transmitter, reducing the filter order of a baseband filter (224) of the mobile station and reducing the dynamic range of an analog to digital converter (225) of the mobile station for reducing mobile station power consumption. Reducing the filter order further beneficially reduces inter-symbol interference. In one embodiment the step of determining determines a speed of the mobile station, and correlates the speed with the probability of the presence of the transmitter such that at a lower speed the determination is that the probability is increased and at a higher speed the determination is that the probability is decreased. A measurement of adjacent channel transmitted power may be used as a verification. The speed is determined based at least in part on an output (184) of a mobile station automatic frequency control function. In another embodiment the step of determining employs information received from a network operator location services function (60). The mobile station can also determine if there is a decreased probability of a presence of a transmitter near to the mobile station that is transmitting on a frequency channel that may cause Inter-Modulation Distortion with a frequency channel being received from a serving cell transmitter. For a case where it is determined that there is a decreased probability of the presence of the transmitter, the method reduces the linearity of the receiver for reducing mobile station power consumption.

88 Claims, 5 Drawing Sheets

METHOD AND APPARATUS PROVIDING ADAPTABLE CURRENT CONSUMPTION FOR MOBILE STATION BASED ON MACROCELL/MICROCELL DETERMINATION

TECHNICAL FIELD

These teachings relate generally to battery powered wireless communications devices and methods and, more particularly, relate to methods and apparatus for optimizing performance and battery power consumption.

BACKGROUND

In a typical battery powered portable wireless communications device, such as a cellular telephone or a personal communicator, referred to herein as a mobile station, the receiver baseband filter and analog to digital converter (ADC) are large consumers of current. In a typical case the operational characteristics of these components, such as filter order for the base band filter and the dynamic range of the ADC, are established according to some assumed worst case reception conditions. In practice, however, these worst case reception conditions are rarely encountered. As a result, the baseband filter and ADC are typically operated in a higher current consumption mode than is required for the actual reception conditions.

One problem that results from the excessive power consumption is a reduced standby time for the mobile station, which results in turn in a requirement to more frequently recharge the battery. One type of wireless system where this problem may exist is based on Wideband Code Division Multiple Access (WCDMA), although other types of mobile stations, such as those based on Time Division Multiple Access (e.g., GSM-compatible mobile stations) can also be affected.

Figure 5:
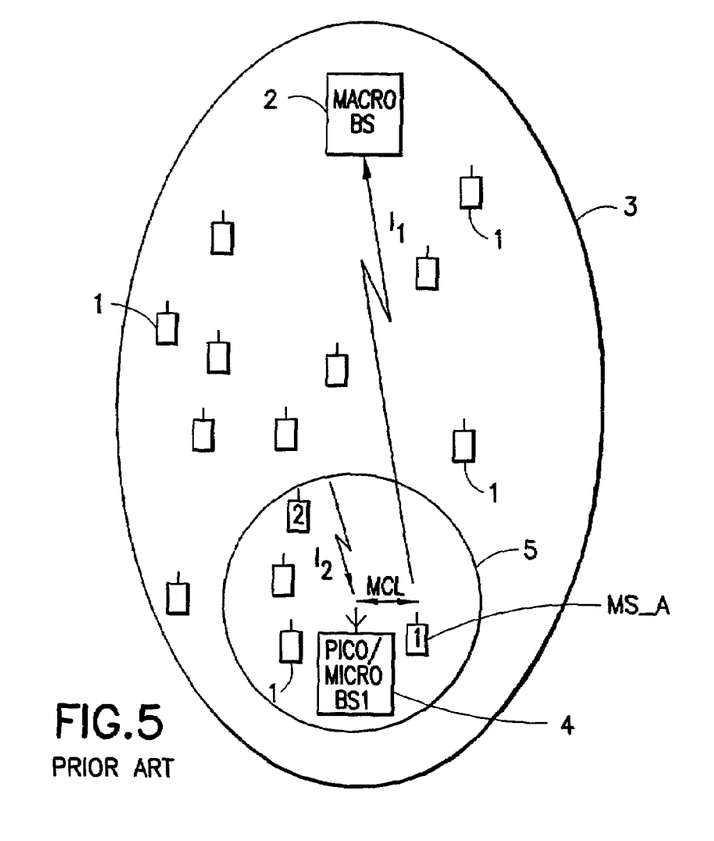
FIG. 5 shows a typical prior art arrangement of a population of mobile stations located in a macrocell that happens to contain a microcell or a picocell.

FIG. 5 shows a typical WCDMA network situation, where a population of mobile stations (MSs) 1 are contained within a macrocell 3 served by a macro base station (BS) 2, and where some of the mobile stations 1 may also be located within a picocell or a microcell 5 served by a pico/micro base station 4. For comparison, and by example, the macrocell 3 may have a diameter measured in tens of kilometers, the microcell may have a diameter that is a kilometer or less (e.g., it may cover an airport or a shopping mall), while the picocell may have a diameter measured in some tens of meters (e.g., within an office). Although physically located within the microcell 5, some of the MSs, such as the one designated MS_A, may actually be served by the macrocell BS 2.

An adjacent channel test is currently used to measure the capability of the MS to tolerate a signal having a frequency located adjacent to a desired carrier frequency. In the current WCDMA system an Adjacent Channel Selectivity (ACS) parameter is defined to be 33 dB, meaning that the MS receiver must be capable of providing up to 33 dB of attenuation to an adjacent frequency channel. In practice, however, the 33 dB of attenuation is not typically required. For example, in FIG. 5 the MS designated MS_A is connected to the macrocell BS 2 through a first frequency channel and is at the same time physically close to the microcell BS 4, that happens to be operating in a second frequency channel that is adjacent in frequency to the first frequency channel. The signal of the microcell BS 4 is thus received by the MS_A with significant power, and the entire 33 dB of ACS attenuation may be required for the MS_A to continue operating with the macrocell BS 2, while the remainder of the population of MSs 1 served by BS 3, i.e., those not physically near to the microcell BS 4, the 33 dB of ACS attenuation is not required. However, if the MSs are designed to always exhibit the maximum ACS attenuation of 33 dB, the result is unnecessary power consumption.

What is thus needed, and what was not available prior to this invention, is a technique for the MS to determine whether the full amount of ACS attenuation is required, or whether less attenuation is adequate in light of the current reception conditions.

SUMMARY OF THE PREFERRED EMBODIMENTS

The foregoing and other problems are overcome, and other advantages are realized, in accordance with the presently preferred embodiments of these teachings.

In a first embodiment of this invention the MS employs a plurality of measurement results that are already present in the MS to make a determination of MS speed. The speed of the MS is correlated with the probability of the presence or absence of a microcell or a picocell, such that a higher MS speed is correlated with a higher probability that the MS is not adjacent to a potentially interfering microcell or picocell, and such that a lower MS speed is correlated with a higher probability that the MS is adjacent to a potentially interfering microcell or picocell. The characteristics of the baseband filter and the ADC are programmably set accordingly, resulting in a savings in power consumption.

In another embodiment of this invention the MS employs information received from a locations services function of the wireless network operator, where the information informs the MS as to whether it is physically adjacent to a microcell or a picocell BS. In response to the received location information the MS controls the characteristics of the baseband filter and the ADC accordingly.

A method is disclosed for operating a mobile station by determining whether there is a decreased probability of a presence of a transmitter near to the mobile station that is transmitting on a frequency channel that is adjacent to a frequency channel being received from a serving cell transmitter and, for a case where it is determined that there is a decreased probability of the presence of the transmitter, the mobile station reduces the filter order of a baseband filter of the mobile station and reduces the dynamic range of an analog to digital converter of the mobile station for decreasing mobile station power consumption. Reducing the filter order further beneficially reduces inter-symbol interference. In one embodiment the step of determining determines or estimates a speed of the mobile station, and correlates the speed with the probability of the presence of the transmitter such that at a lower speed the determination is that the probability is increased and at a higher speed the determination is that the probability is decreased. A measurement of adjacent channel power may be used as a verification. The speed is determined based at least in part on an output of a mobile station automatic frequency control function. In another embodiment the step of determining employs information received from a network operator location services function. A mobile station that operates in accordance with the method is also disclosed.

The mobile station can also determine if there is a decreased probability of a presence of a transmitter near to the mobile station that is transmitting on a frequency channel that may cause Inter-Modulation Distortion with a frequency channel being received from a serving cell transmitter. For a case where it is determined that there is a decreased probability of the presence of the transmitter, the method reduces the linearity of the receiver for reducing mobile station power consumption.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
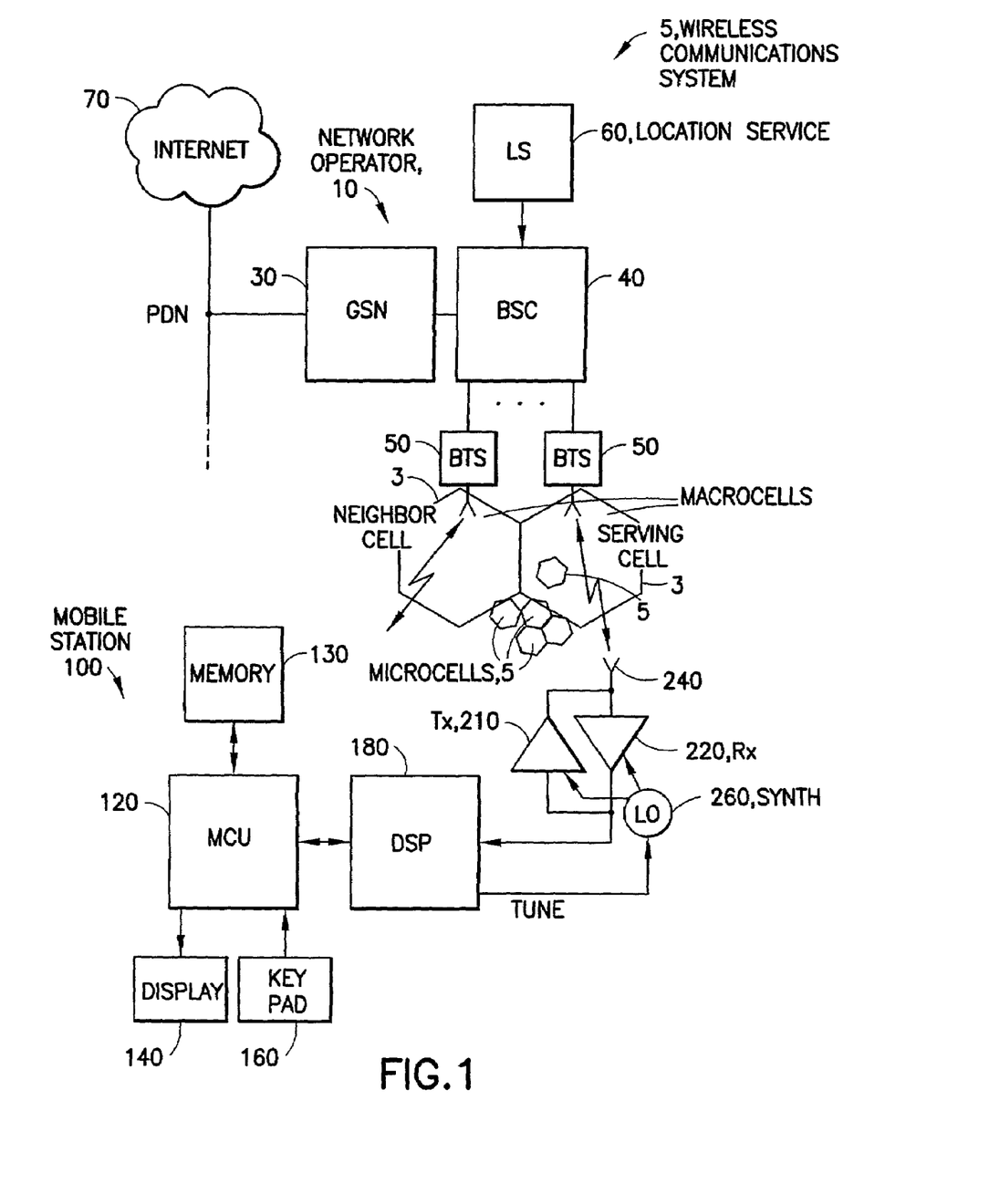
FIG. 1 is a simplified block diagram of a mobile station and a wireless communications network that are suitable for practicing this invention.

Referring first to FIG. 1, there is illustrated a simplified block diagram of an embodiment of a wireless communications system 5 that is suitable for practicing this invention. The wireless communications system 5 includes at least one mobile station (MS) 100. FIG. 1 also shows an exemplary network operator having, for example, a General Packet Radio System (GPRS) Support Node (GSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic.

Each BTS 50 supports a macrocell 3 as was shown in FIG. 5. For the purposes of this invention there may be one or more of the microcells 5 contained wholly or partially within the macrocell 3, as was also shown in FIG. 5. The macro and micro cells are shown to have a hexagonal shape for convenience. Hereafter, a reference to a microcell is intended to mean a microcell or a picocell, or in general any cell that can spatially coexist with a macrocell, and that contains a transmitter that may have a potential to interfere with the reception of signals by the MS from the macrocell BTS 50, e.g., a transmitter capable of transmitting on a frequency channel that is adjacent (in frequency space) to a frequency channel transmitted by the BTS 50 of the serving cell.

The air interface standard can conform to any suitable standard or protocol, and may enable both voice and data traffic, such as data traffic enabling Internet 70 access and web page downloads. In the presently preferred embodiment of this invention the air interface standard is a CDMA or a WCDMA standard, while in other embodiments the air interface standard could be, for example, one based on TDMA that supports a GSM or an advanced GSM protocol and air interface.

The network operator may also include a suitable type of Location Services (LS) function 60 that is capable of determining a location of the MS 100, such as by triangulation in cooperation with other base stations, and that is capable of sending a Location Services message to the MS 100 for informing the MS 100 generally of its physical location and, more specifically, whether the MS 100 is located within a microcell 5 and thus near to a microcell transmitter 4. For this purpose the LS function 60 is assumed to store or have access to a stored digital map that contains locations of microcells, and can plot the determined location of the MS 100 on the map.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 can be carried in a vehicle or installed within a vehicle. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines required to implement the methods in accordance with these teachings, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

Figure 2:
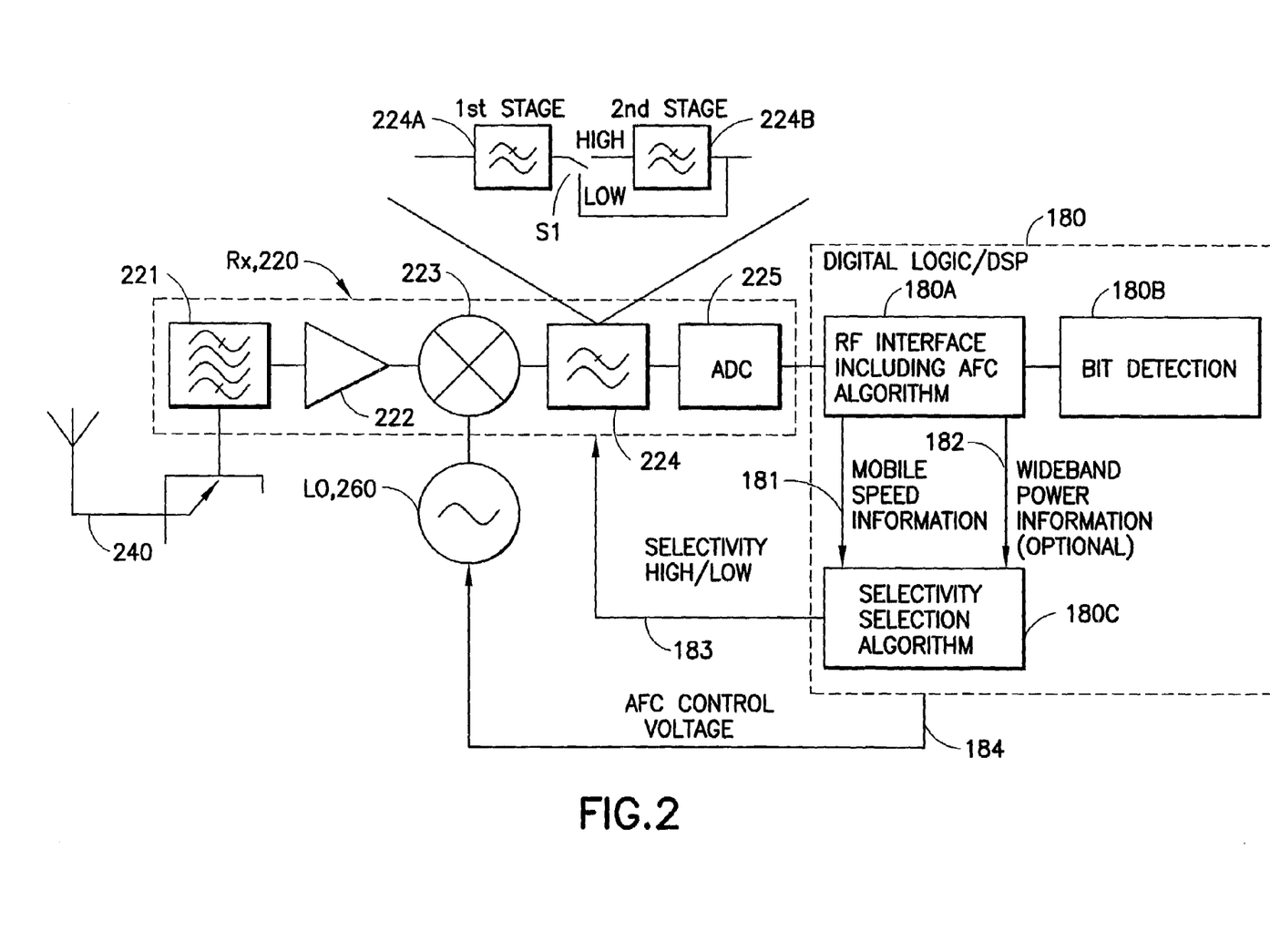
FIG. 2 is a block diagram of an embodiment of the mobile station receiver and DSP shown in FIG. 1.

FIG. 2 shows in greater detail the receiver 220 receiving a frequency channel from the antenna 240. The receiver 220 is depicted as a direct conversion receiver (DCR), but the teachings of this invention are not limited to the DCR embodiment, and superheterodyne receiver architectures can also benefit from the use of this invention.

The receiver 220 includes an input bandpass filter 221, a low noise amplifier (LNA) 222 and a downconversion mixer 223 that receives a mixing frequency from the LO 260. The received RF frequency is mixed to baseband (0 Hz Intermediate Frequency (IF)) in the mixer 223 and applied to a baseband filter 224. In the preferred embodiment the baseband filter 224 is a multi-element low pass filter component that is programmably switched with switch S 1 from using a first stage 224A and a second stage 224B to using only the first stage 224 (i.e., the second stage 224B is bypassed by S1). Following the baseband filter 224 is a ADC 225, preferably an ADC having a programmable dynamic range.

The digital output from the ADC 225 is applied to the DSP 180. More specifically, the digital output from the ADC 225, representing the received downconverted signal, is applied to an RF interface function 180A of the DSP 180. The RF interface function 180A includes an automatic frequency control (AFC) function. The output of the RF interface function 180A is applied to a bit detection function 180B, the operation of which is not particularly germane to an understanding of this invention. A first output of the RF interface function 180A is MS speed information 181 that is applied to a Selectivity Selection Algorithm (SSA) 180C in accordance with an aspect of this invention. An optional second output 182 is Wideband Power Information obtained, typically, by power measurements made on adjacent frequency channels.

The SSA 180C outputs a Selectivity Selection control signal (High/Low) 183 that is used to control the state of S1, and thereby the order of the baseband filter 224, and that also may be used to programmably adjust the dynamic range of the ADC 225.

In a preferred embodiment the SSA 180C obtains an indication of the speed of the MS 100 and correlates the MS speed with the probability of the presence of the transmitter such that at a lower speed the determination is that the probability is increased and at a higher speed the probability is decreased. That is, at higher speeds (e.g., a speed greater than a typical user walking speed), it is assumed that the MS 100 may be located in a vehicle, and thus the probability is decreased that the MS 100 is located within a microcell 5 and closely adjacent to the microcell base station transmitter 4. Conversely, at lower speeds (or zero, meaning that the MS 100 is stationary) it is assumed that the MS 100 may be carried on the person of the user and in use in a non-vehicular environment, and thus the probability is increased that the MS 100 is located within a microcell 5 and is closely adjacent to the microcell base station transmitter 4.

Another output from the DSP 180 is an AFC control voltage 184 that is supplied to the LO 260 and that is used for making adjustments in the output frequency to compensate for Doppler-induced frequency shifts in the received signal frequency, as well as to compensate for offsets and other inaccuracies inherent in the operation of the voltage controlled oscillator (VCO) function of the LO 260.

In the first embodiment of this invention the indication of the speed of the MS 100 that is derived by the AFC function of the RF Interface 180A is used. The MS speed information can be determined from the AFC algorithm, although preferably not directly as the AFC control voltage 184 also include a component that compensates for the non-speed related VCO inaccuracies, as was discussed above. A number of suitable techniques for deriving the MS speed exist, such as one disclosed by Gang Li and Yu Jin, "A Speed Estimation Based Two-Stage Symbol Aided Channel Estimator for Frequency NonSelective Variant Fading Channel", Personal Wireless Communications, 2000 IEEE International Conference, pgs. 109-113, incorporated by reference herein in its entirety. By whatever technique it is determined, it is assumed that the MS speed information 181 is available to the SSA 180C.

The adjacent channel power information, referred to as the wideband power information 182 in the embodiment of FIG. 2, may also be used in conjunction with the MS speed information 181 by the SSA 180C. In this case a parameter, designated adjacent_channel_power for convenience, is provided in order to define the amount of adjacent channel power after the selectivity filter. This parameter can be used in conjunction with the speed estimation information to define the actual need for selectivity, as well as the ADC 225 dynamic. In a most preferred embodiment the optional wideband power information 182 is used in conjunction with the mobile speed information 181 as a verification, when a low MS 100 speed is indicated, that a significant adjacent channel power level is also being received, thereby confirming the presence of the close-by microcell transmitter 4. If the verification fails, and despite the low MS speed indication, it may be assumed that there is no nearby interfering microcell transmitter 4, and the MS 100 can be operated with relaxed baseband filter 224 and ADC 225 parameters.

In a further embodiment of this invention the above-mentioned network LS function 60 provides a message to the MS 100 for informing the MS that it is located in a microcell 5. In this case the mobile speed information signal 181 is generated to indicate a low mobile station speed, or it may be replaced by another signal that simply reflects the presence of the microcell (e.g., a microcell_present signal). The optional wideband power information signal 182 may still be used as before, i.e., to verify the close-by presence of the microcell transmitter 4. In principle, and assuming that the network 10 has knowledge of the location of each base station and each MS 100, it may also provide an indication when ACS filtering is required, and based on this indication the MS 100 can control its selectivity.

If the LS function 60 is used to indicate the presence of a microcell 5 then preferably some amount of hysteresis is provided to prevent rapid changes of state such as would occur if the MS 100 were carried in a vehicle moving at 100 km/hr such that the MS 100 rapidly passed through a microcell 5 while connected to the serving macrocell 3.

A combination of the output of the LS function 60 and the MS speed information signal 181 that is output from the speed estimation algorithm can be used as well, as could a combination of the LS function 60, the output of the speed estimation algorithm and the wideband power information signal 182.

Figure 6:
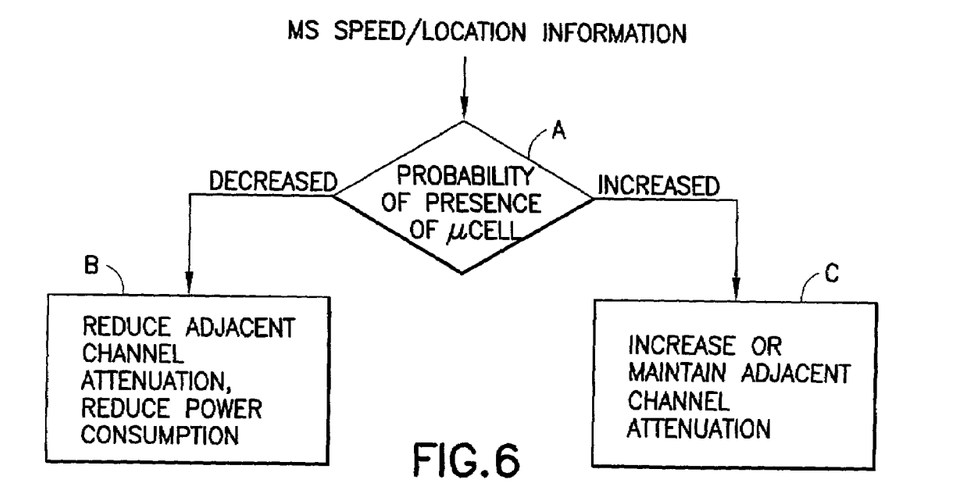
FIG. 6 is a logic flow diagram in accordance with a method of this invention.

In any case, and referring to Step A of FIG. 6, the SSA 180C determines whether there is an increased or a decreased probability of a presence of a transmitter near to the MS 100 that is transmitting on a frequency channel that is adjacent to a frequency channel being received from the serving cell transmitter 50 and, for a case where it is determined that there is a decreased probability of the presence of the transmitter 4, at Step B the SSA 180C changes the operation of at least one receiver 220 component so as to reduce an amount of adjacent channel attenuation and to reduce MS 100 power consumption. For the case where it is determined that there is an increased probability of the presence of the transmitter 4, at Step C the SSA 180C changes the operation of at least one receiver 220 component so as to increase the amount of adjacent channel attenuation (if it was previously reduced), or it maintains a high level of adjacent channel attenuation if it was not previously reduced.

The SSA 180C is responsive to its input(s) for controlling the state of the Selectivity High/Low signal 183 to control the characteristics of the baseband filter 224 and also, preferably, the dynamic range of the ADC 225. As an example of the latter, and for the case where the ADC 225 is implemented using a sigma-delta type converter, the dynamic range can be increased or decreased by increasing or decreasing, respectively, the oversampling ratio.

For example, assume that a fourth order (or higher) baseband filter 224 is required for the worst case reception conditions in order to achieve the required ACS attenuation, as can be caused by the presence of the microcell base station 4 operating in an adjacent frequency channel to the frequency channel being received by the BTS 50 of the serving cell 3, while for other, more typical reception conditions only a second order baseband filter 224 is required. Assume further that the fourth order baseband filter 224 requires two operational amplifiers, actually four, two for the Inphase (I) channel and two for the Quadrature (Q) channel, while the second order baseband filter 224 requires only half as many. By controlling S 1 to connect or disconnect the second filter stage 224B either the fourth order baseband filter or the second order baseband filter, respectively, is realized. Preferably, when S 1 bypasses the second stage filter 224B the filter components thereof are powered down or off, thereby further conserving power consumption.

Figure 3:
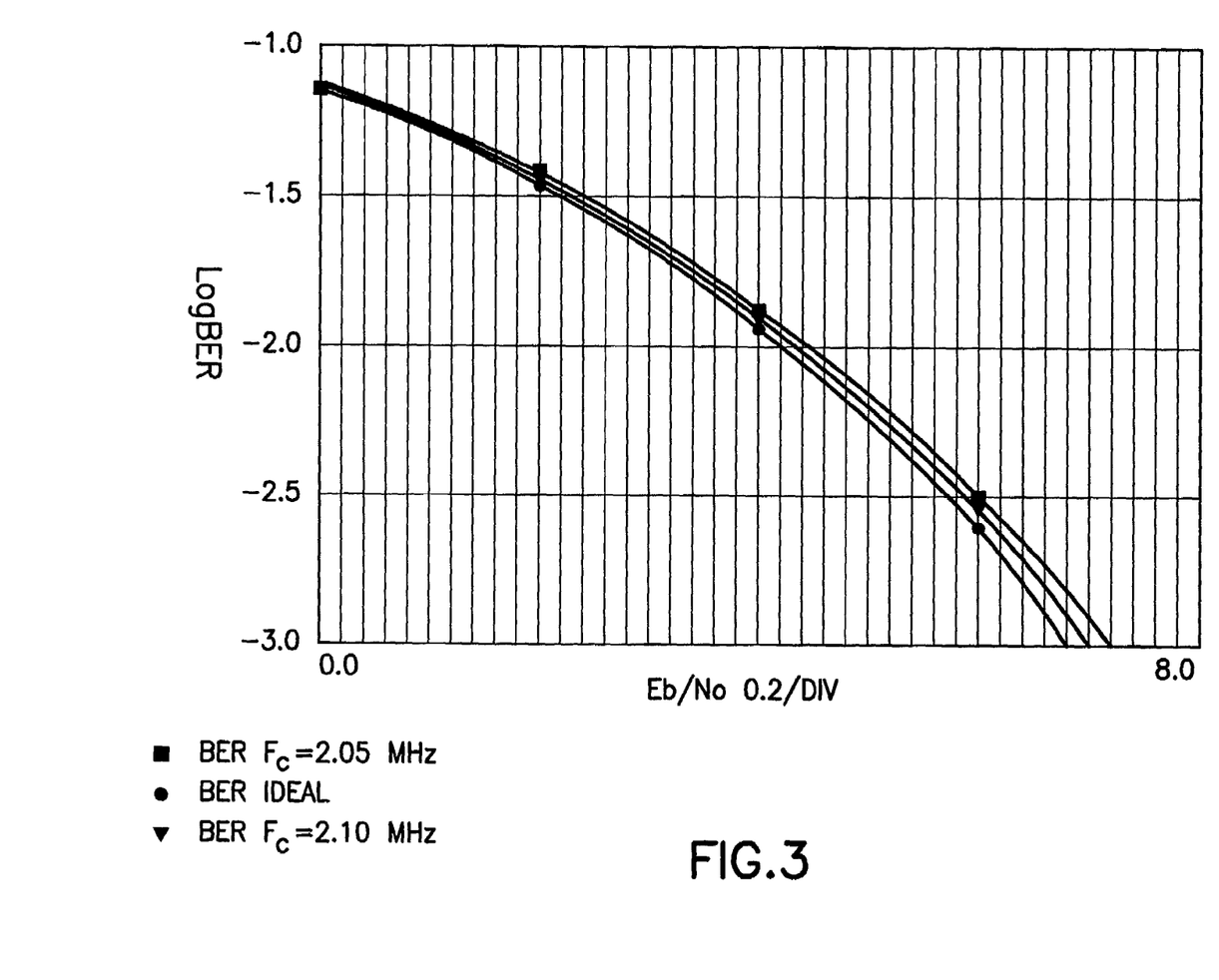
FIG. 3 is a graph that illustrates the effect of a corner frequency change in a fifth order Butterworth filter on Bit Error Rate (BER)
Figure 4:
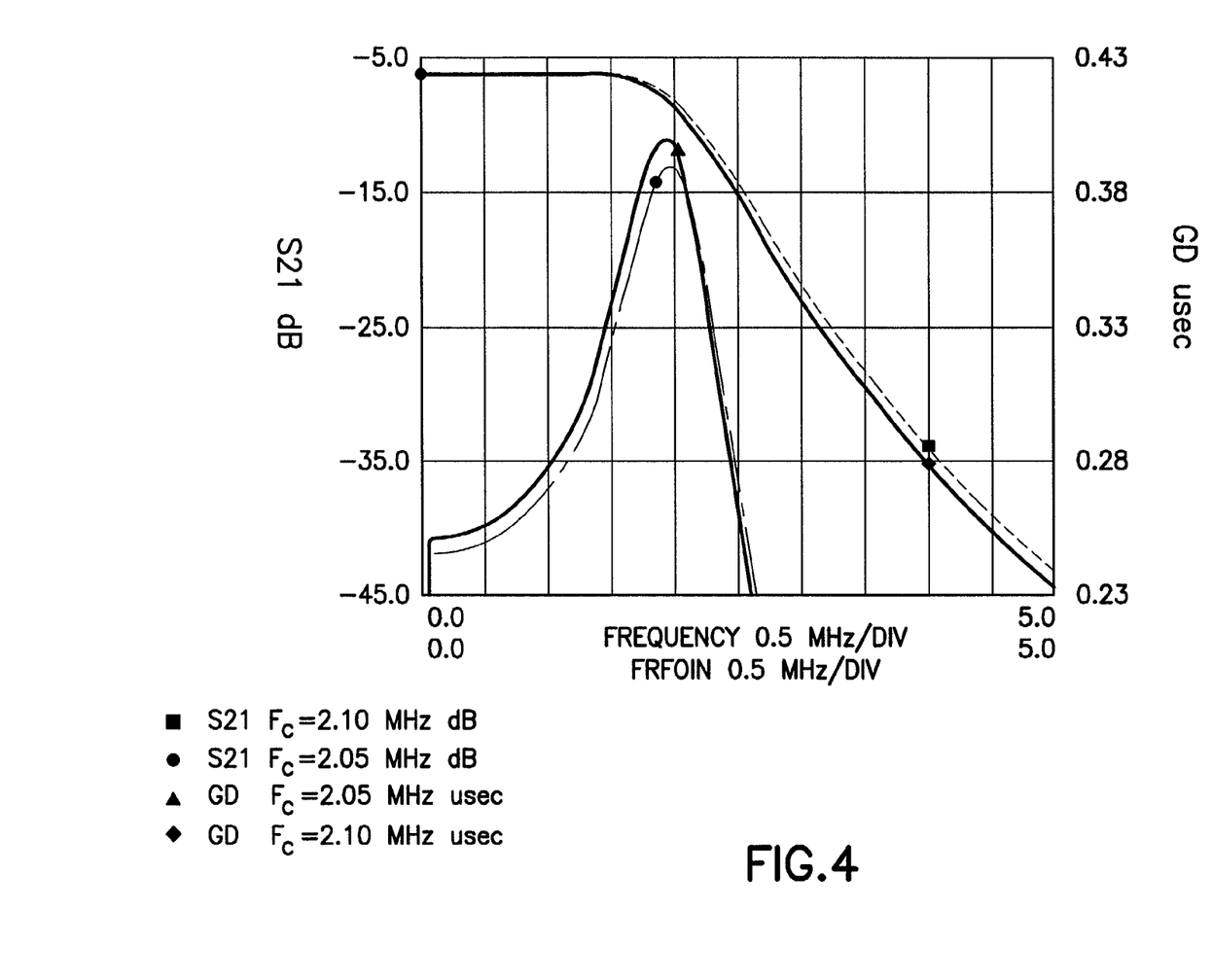
FIG. 4 is a graph that illustrates the effect on group delay by changing from a fourth order filter to a second order filter.

The differences made in signal reception are made evident by the graphs of FIGS. 3 and 4. FIG. 3 illustrates by example the effect of a frequency change (2.05 to 2.10 MHz) in a fifth order Butterworth filter in the receiver Bit Error Rate (BER). FIG. 4 shows that when changing from a fourth order filter to the second order filter the group delay is reduced, resulting in a higher value of the signal to interference ratio (SIR). In FIG. 4 S21 stands for Amplitude Response, and GD stands for Group Delay.

In the preferred embodiment the baseband filter 224 operates in one of two modes, the fourth order mode or the second order mode, and the ADC 225 operates with one of two corresponding oversampling ratios. The binary state of the Selectivity High/Low signal 183 selects one of the two modes of operation for the baseband filter 224 and the ADC 225, thereby enabling power savings to be realized when operating in the second order filter/reduced oversampling ratio mode of operation, which is the desired result.

A further advantage of this technique is that less intersymbol interference (ISI) typically results when the baseband filter 224 is operated in the second order mode. The reduction in ISI can be especially beneficial when using complex modulation formats that require a high signal to noise ratio (SNR). For example, certain cellular systems such as EGPRS (Enhanced General Packet Radio Service) use different channel coding schemes that require different SNRs. At the highest data rate there is no channel coding used at all, which requires the highest SNR. The highest SNR is typically provided nearest to the BTS 50. The limiting factors in SNR/SIR include other network users and non-ideal conditions in the receiver 220, such as the above-mentioned analog group filter delay. If one assumes that the MS 100 is operating near to the BTS 50 of the serving cell 3, and that the MS 100 can determine that there is no significant adjacent channel interference, the reduction in the order of the baseband filter 224, and the corresponding reduction in the ISI, can be especially beneficial when operating, for example, at the highest data rate in the EGPRS system without channel coding.

It is noted that a change in the order of the baseband filter 224 causes a phase change in the received signal. For example, changing the baseband filter order from four to two induces a phase change in the Inphase-Quadrature (IQ) constellation. The invention accommodates this phase change by compensating the received signal for the phase change that results from the change of order of the baseband filter 224. For example, the DSP 180 can make this compensation by multiplying the IQ signal by a predetermined complex number that is proportional to the phase difference caused by the change of order of the baseband filter 224.

While described above in the context of presently preferred embodiments of this invention, those skilled in the art should realize that certain changes in form and details may be made therein, and that these modifications will still fall within the scope of this invention. For example, the speed information can be derived by other techniques, as can the location of the MS 100. For example, the location of the MS 100 may be self-determined using GPS or some other positioning system. Also, the SSA 180C may control the state of other components, besides the baseband filter 224 and the ADC 225, so as to optimize their performance and power consumption for the current signal reception conditions.

In addition, the receiver 220 linearity can be controlled based on the macrocell/microcell determination so that the most optimum linearity is used only when it is actually required, for example, when there are strong signals present on other frequencies than the frequency of the desired carrier. These other signals need not be adjacent channel frequencies, but can instead exhibit frequency components that result in the generation of Inter-Modulation Distortion (IMD). By increasing the receiver linearity only when required to suppress the DAD, additional power savings are realized.

Thus, the teachings of this invention are not limited to only controlling the receiver adjacent channel attenuation, as the receiver linearity can be controlled as well, or only the receiver linearity, or only the receiver adjacent channel attenuation may be controlled in some cases. As such, the controlled receiver parameter(s) may be generically referred singularly, or in the aggregate, as a receiver 220 "other channel suppression characteristic" that can be increased in the presence of a potentially interfering signal (an adjacent channel or a non-adjacent channel signal) and decreased in the absence of a potentially interfering signal.

What is claimed is:

1. A method to reduce power consumption in a mobile station, comprising:

determining in the mobile station whether there is a decreased probability of a presence of at least one transmitter near to the mobile station that is transmitting a potentially interfering signal relative to a frequency channel being received from a serving cell transmitter; and for a case where it is determined that there is a decreased probability of the presence of the at least one transmitter, changing the operation of at least one receiver component so as to decrease a receiver other channel suppression characteristic and to decrease mobile station power consumption.

2. A method as in claim 1, where determining determines a speed of the mobile station, and correlates the speed with the probability of the presence of the transmitter such that at a lower speed the determination is that the probability is increased and at a higher speed the determination is that the probability is decreased.

3. A method as in claim 2, and further comprising using a measurement of adjacent channel transmitted power as a verification of the determination.

4. A method as in claim 1, where determining employs information received from a network operator.

5. A method as in claim 2, where the speed is determined based at least in part on an output of a mobile station automatic frequency control function.

6. A method as in claim 2, where the speed is determined based at least in part on an output of a mobile station Doppler frequency shift compensation function.

7. A method as in claim 1, where the at least one receiver component comprises a baseband filter, and where changing changes the order of the baseband filter.

8. A method as in claim 1, where the at least one receiver component comprises a baseband filter, and where changing changes a dynamic range of an analog to digital converter that is coupled to the baseband filter.

9. A method as in claim 1, where the at least one receiver component comprises a baseband filter, and where changing changes an oversampling ratio of a sigma delta converter that is coupled to the baseband filter.

10. A method as in claim 7, and further comprising compensating a received signal for a phase change that results from the change of order of the baseband filter.

11. A method as in claim 1, where changing the operation of the at least one receiver component operates to change receiver linearity.

12. A method as in claim 1, where the receiver other channel suppression characteristic comprises an adjacent channel attenuation characteristic.

13. A method as in claim 1, where the receiver other channel suppression characteristic comprises receiver linearity.

14. A method as in claim 1, where the method is executed by a data processor of the mobile station under control of a stored program in a memory of the mobile station.

15. A mobile station comprising a receiver; means for determining whether there is a decreased probability of a presence of at least one transmitter near to said mobile station that is transmitting a potentially interfering signal relative to a frequency channel being received from a serving cell transmitter; and means, responsive to said determining means determining that there is a decreased probability of the presence of the at least one transmitter, for changing operation of at least one receiver component so as to decrease a receiver other channel suppression characteristic and to decrease mobile station power consumption.

16. A mobile station as in claim 15, where said determining means determines a speed of said mobile station, and correlates the speed with the probability of the presence of the transmitter such that at a lower speed the determination is that the probability is increased and at a higher speed the determination is that the probability is decreased.

17. A mobile station as in claim 16, where said determining means is further responsive to a measurement of adjacent channel transmitted power for using the measurement as a verification of the presence of the transmitter.

18. A mobile station as in claim 15, where said determining means employs information received from a network operator location services function.

19. A mobile station as in claim 16, where the speed is determined based at least in part on an output of a mobile station automatic frequency control function.

20. A mobile station as in claim 16, where the speed is determined based at least in part on an output of a mobile station Doppler frequency shift compensation function.

21. A mobile station as in claim 15, where the at least one receiver component comprises a baseband filter having a filter order that is changeable by said changing means.

22. A mobile station as in claim 15, where the at least one receiver component comprises an analog to digital converter having a dynamic range that is changeable by said changing means.

23. A mobile station as in claim 15, where the at least one receiver component comprises a sigma delta converter having an oversampling ratio that is changeable by said changing means.

24. A mobile station as in claim 21, and further comprising means for digitally compensating a received signal for a phase change that results from the change of order of the baseband filter.

25. A mobile station as in claim 15, where said changing means is adapted to change receiver linearity.

26. A mobile station as in claim 15, where the receiver other channel suppression characteristic comprises an adjacent channel attenuation characteristic.

27. A mobile station as in claim 15, where the receiver other channel suppression characteristic comprises receiver linearity.

28. A method, comprising:
    determining whether there is a decreased probability of a presence of a transmitter near to a mobile station that is transmitting on a frequency channel that is adjacent to a frequency channel being received from a serving cell transmitter; and
    for a case where it is determined that there is a decreased probability of the presence of the transmitter, reducing a filter order of a baseband filter of the mobile station and reducing a dynamic range of an analog to digital converter of the mobile station for reducing mobile station power consumption.

29. A method as in claim 28, where reducing the filter order further reduces inter-symbol interference.

30. A method as in claim 28, where determining estimates a speed of the mobile station, and correlates the estimated speed with the probability of the presence of the transmitter such that at a lower speed the determination is that the probability is increased and at a higher speed the determination is that the probability is decreased.

31. A method as in claim 30, and further comprising using a measurement of adjacent channel transmitted power as a verification of the speed estimation.

32. A method as in claim 28, where determining employs information received from a network operator location services function.

33. A method as in claim 30, where the speed is determined based at least in part on an output of a mobile station automatic frequency control function.

34. A method as in claim 30, where the speed is determined based at least in part on an output of a mobile station Doppler frequency shift compensation function.

35. A method as in claim 28, further comprising reducing receiver linearity.

36. A method, comprising:
    determining whether there is a decreased probability of a presence of a transmitter near to a mobile station that is transmitting on a frequency channel that may cause Inter-Modulation Distortion with a frequency channel being received from a serving cell transmitter; and
    for a case where it is determined that there is a decreased probability of the presence of the transmitter, reducing receiver linearity for reducing mobile station power consumption.

37. A method as in claim 36, where determining estimates a speed of the mobile station, and correlates the estimated speed with the probability of the presence of the transmitter such that at a lower speed the determination is that the probability is increased and at a higher speed the determination is that the probability is decreased.

38. A method as in claim 37, and further comprising using a measurement of adjacent channel transmitted power as a verification of the speed estimation.

39. A method to reduce power consumption in a device, comprising:
   determining in the device whether there is a decreased probability of a presence of at least one transmitter that is transmitting a potentially interfering signal relative to a frequency channel being received from another transmitter; and
   for a case where it is determined that there is a decreased probability of the presence of the at least one transmitter, changing the operation of at least one receiver component so as to decrease a receiver other channel suppression characteristic and to decrease device power consumption.

40. A method as in claim 39, where determining determines a speed of the device, and correlates the speed with the probability of the presence of the transmitter such that at a lower speed the determination is that the probability is increased and at a higher speed the determination is that the probability is decreased.

41. A method as in claim 39, where the at least one receiver component comprises a baseband filter, and where changing changes the order of the baseband filter.

42. A method as in claim 39, where changing the operation of the at least one receiver component operates to change receiver linearity.

43. A method as in claim 39, where the receiver other channel suppression characteristic comprises an adjacent channel attenuation characteristic.

44. A method as in claim 39, where the method is executed by a data processor of the device under control of a stored program in a memory of the device.

45. An apparatus comprising a receiver and circuitry adapted to determine whether there is a decreased probability of a presence of at least one transmitter near to said apparatus that is transmitting a potentially interfering signal relative to a frequency channel being received from another transmitter and, for a case where it is determined that there is a decreased probability of the presence of the at least one transmitter, to change the operation of at least one receiver component so as to decrease a receiver other channel suppression characteristic and to decrease apparatus power consumption.

46. A method to operate a device, comprising:
   determining whether there is a change in probability of a presence of a potentially interfering signal on a frequency channel that is adjacent to a frequency channel being received from a transmitter; and
   adjusting a characteristic of the device in accordance with the determined change in the probability of a presence of a potentially interfering signal.

47. A method as in claim 46, for a case where it is determined that there is an increased probability of the presence of a potentially interfering signal, increasing a filter order of a baseband filter of the device and increasing the dynamic range of an analog to digital converter of the device for increasing device power consumption.

48. A method as in claim 46, for a case where it is determined that there is an increased probability of the presence of a potentially interfering signal, increasing adjacent channel attenuation.

49. A method as in claim 46, for a case where it is determined that there is a decreased probability of the presence of a potentially interfering signal, reducing a filter order of a baseband filter of the device and reducing the dynamic range of an analog to digital converter of the device for reducing device power consumption.

50. An apparatus according to claim 46, wherein the at least one characteristic comprises a device power consumption level.

51. An apparatus according to claim 46, wherein determining comprises employing information received from a network operator location services function.

52. A method according to claim 46, further comprising receiving digital information.

53. A method according to claim 52, further comprising providing a device speed after receiving the digital information.

54. A method according to claim 52, further comprising providing power information on at least one adjacent frequency channel.

55. A method according to claim 46, wherein adjusting comprises selecting a mode of operation of a filter.

56. A method according to claim 46, wherein the method is performed in a mobile station.

57. A method according to claim 56, where determining comprises determining a speed of the mobile station and correlating the speed with the presence of the potentially interfering signal such that at a lower speed the determination is that the probability is increased and at a higher speed that determination is that the probability is decreased.

58. A method according to claim 57, where determining is responsive to a measurement of adjacent channel transmitted power for using the measurement as a verification of the presence of the potentially interfering signal.

59. A method according to claim 58, where determining the speed is based at least in part on an output of a mobile station automatic frequency control function.

60. A method according to claim 58, where determining the speed is based at least in part on an output of a mobile station Doppler frequency shift compensation function.

61. A method according to claim 46, where determining comprises providing a control voltage to a local oscillator.

62. A method according to claim 46, wherein the at least one characteristic of a device comprises a receiver other channel suppression characteristic.

63. A method according to claim 46, wherein the at least one characteristic comprises an adjacent channel attenuation characteristic.

64. A method according to claim 46, wherein the at least one characteristic comprises receiver linearity.

65. A method to operate a device, comprising:
   determining whether there is a change in probability of a presence of a potentially interfering signal near the device; and
   adjusting a characteristic of the device in accordance with the determined change in the probability of a presence of a potentially interfering signal.

66. A method as in claim 65, wherein, if it is determined that the probability has increased, increasing device power consumption; and
   if it is determined that the probability has decreased, decreasing device power consumption.

67. A device, comprising:
   circuitry adapted to determine whether there is a change in probability of a presence of a potentially interfering signal source near the device;

wherein, in response to a determination of a change in the probability of a presence of a potentially interfering signal source near the device, said circuitry is further adapted to adjust at least one characteristic of the device.

68. A device as in claim 67, wherein said circuitry is operable, if it is determined that the probability has increased, to increase device power consumption; and if it is determined that the probability has decreased, to decrease device power consumption.

69. A device as in claim 68, wherein the probability of the presence of a potentially interfering signal source corresponds to a probability of a presence of a microcell.

70. A circuit, comprising:
control circuitry to determine a change in a probability of presence of a potentially interfering signal,
the control circuitry being configured to adjust at least one characteristic of a device if it is determined that there is a change in the probability of the presence of a potentially interfering signal.

71. A circuit according to claim 70, wherein the at least one characteristic comprises a device power consumption level.

72. A circuit according to claim 70, wherein the control circuitry employs information received from a network operator location services function.

73. A circuit according to claim 72, further comprising a selectivity algorithm.

74. A circuit according to claim 73, wherein the control circuitry provides a device speed to the selectivity algorithm.

75. A circuit according to claim 73, wherein the control circuitry provides power information on at least one adjacent frequency channel to the selectivity algorithm.

76. A circuit according to claim 70, wherein the selectivity algorithm selects a mode of operation of a filter.

77. A circuit according to claim 70, wherein the circuit is embodied in a mobile station.

78. A circuit according to claim 77, where said control circuitry determines a speed of said mobile station, and correlates the speed with the presence of the potentially interfering signal such that at a lower speed the determination is that the probability is increased and at a higher speed the determination is that the probability is decreased.

79. A circuit according to claim 78, where the control circuitry is further responsive to a measurement of adjacent channel transmitted power for using the measurement as a verification of the presence of the potentially interfering signal.

80. A circuit according to claim 78, where the speed is determined based at least in part on an output of a mobile station automatic frequency control function.

81. A circuit according to claim 78, where the speed is determined based at least in part on an output of a mobile station Doppler frequency shift compensation function.

82. A circuit according to claim 70, where the control circuitry provides a control voltage to a local oscillator.

83. A circuit according to claim 70, wherein the at least one characteristic of a device comprises a receiver other channel suppression characteristic.

84. A circuit according to claim 70, wherein the at least one characteristic comprises an adjacent channel attenuation characteristic.

85. A circuit according to claim 70, wherein the at least one characteristic comprises receiver linearity.

86. A circuit according to claim 70, wherein the circuit comprises part of a communication apparatus.

87. A circuit according to claim 70, wherein the circuit is embodied in an integrated circuit.

88. A circuit according to claim 70, wherein the circuit is embodied in a digital signal processor.

* * * * *